(12) United States Patent
Nakamura et al.

(10) Patent No.: US 7,761,965 B2
(45) Date of Patent: Jul. 27, 2010

(54) AUTOMATIC SWIVELING TURRET APPARATUS FOR MACHINE TOOL

(75) Inventors: Takio Nakamura, Nagaoka (JP); Tatsuo Shimizu, Nagaoka (JP); Ryuji Nishiyama, Nagaoka (JP); Akihiro Goto, Nagaoka (JP); Takashi Ueda, Nagaoka (JP)

(73) Assignee: O-M Ltd., Osaka-shi, Osaka (JP)

( * ) Notice: Subject to any disclaimer, the term of this patent is extended or adjusted under 35 U.S.C. 154(b) by 238 days.

(21) Appl. No.: 12/045,257

(22) Filed: Mar. 10, 2008

(65) Prior Publication Data
US 2009/0087270 A1    Apr. 2, 2009

(30) Foreign Application Priority Data
Oct. 2, 2007    (JP) ............................. 2007-258549

(51) Int. Cl.
*B23B 39/20*    (2006.01)
*B23B 29/24*    (2006.01)
(52) U.S. Cl. .............................. 29/35.5; 82/120; 82/121
(58) Field of Classification Search ................. 29/35.5, 29/36, 39, 41, 40, 42, 50; 82/117, 120, 121, 82/137, 159
See application file for complete search history.

(56) References Cited

U.S. PATENT DOCUMENTS

| 3,116,537 | A | * | 1/1964 | Boner ............................. 29/44 |
| 4,054,975 | A | * | 10/1977 | Lundstrom ................... 29/27 C |
| 4,790,053 | A | * | 12/1988 | Godbecker ...................... 29/42 |
| 4,922,591 | A | * | 5/1990 | Campbell ...................... 483/1 |
| 5,791,832 | A | * | 8/1998 | Yamayose ................... 407/113 |
| 6,016,729 | A | * | 1/2000 | Pfeifer et al. .................. 82/121 |
| 6,032,343 | A | * | 3/2000 | Blanch et al. ................ 29/33 R |

FOREIGN PATENT DOCUMENTS

JP    57-149903 U    9/1982

* cited by examiner

*Primary Examiner*—Will Fridie, Jr.
(74) *Attorney, Agent, or Firm*—Sughrue Mion, PLLC

(57) ABSTRACT

It is an object of the present invention to provide a hydraulic-free automatic swiveling turret apparatus which can easily ensure a swiveling function that is smooth and superior in terms of durability using a simple construction without any need to install a hydraulic pressure reducing mechanism requiring complicated design and control. The present invention provides an automatic swiveling turret apparatus for a machine tool comprising a wedge mechanism (13) which is constructed so that a resistance reducing member (9) that reduces the sliding frictional resistance during swiveling of the turret (3) is disposed on the inside surface part of the sliding movement gap (7) that abuts when the anchoring and fastening of the clutch device (4) are released by causing the sliding of the turret (3) in the axial direction as a result of allowing the inflow of air into the clutch release pressure chamber (6), and in which the turret (3) in a working position that does not allow swiveling, which is anchored and fastened by the clutch device (4), is anchored in a wedged fashion and held as a result of return sliding.

5 Claims, 4 Drawing Sheets

DURING WEDGE LOCKING

WHEN WEDGE LOCKING IS RELEASED

AUTOMATIC SWIVELING TURRET APPARATUS FOR MACHINE TOOL

BACKGROUND OF THE INVENTION

1. Field of the Invention

The present invention relates to an automatic swiveling turret apparatus used in a machine tool such as a large vertical lathe or the like.

2. Description of the Related Art

Automatic swiveling turret apparatuses, in which a plurality of tools that can be switched for use by swiveling are installed on a turret, and this turret is automatically swiveled with respect to a turret stand when the tools are switched, generally have the following construction (parts that are the same as in the present embodiment will be described using the same symbols while referring to the drawings showing the present embodiment).

There is provided a clutch device 4, in which a turret 3 on which a plurality of tools (a plurality of cutting tools 14 respectively disposed in a replaceable manner in a plurality of holders 20) are disposed, is swivelably fit over a swiveling shaft part 2 that is fastened in a protruding manner to the turret stand 1. The turret 3 is provided in a reciprocatingly slidable manner along the swiveling shaft part 2. An indexed position of the turret is anchored and fastened in a manner that allows free disengagement by the sliding of this turret 3 in the axial direction, and the system is devised so that the anchoring and fastening of the clutch device 4 are released (unclamped) by sliding the turret 3 toward the distal end part from the base end part, thus allowing free swiveling of the turret 3, and so that the turret 3 is again caused to perform a return sliding movement at the indexed position following swiveling, and is anchored and fastened (clamped) by the clutch device 4 so that swiveling is impossible.

In concrete terms, a swiveling gear part 17 which engages with a transmission gear 16 that is driven by a calculated swiveling driving device 15 is disposed on this turret 3, and a clutch anchoring part 18 is disposed on the turret stand 1 as a clutch device 4; furthermore, a clutch engaging part 19 which makes a rotation-stopping interlocking engagement with the clutch anchoring part 18 is disposed on the base end part of the turret 3, and the system is constructed so that when the turret 3 is caused to slide toward the distal end part from the base end part, the engagement between the clutch anchoring part 18 and clutch engaging part 19 is released so that swiveling becomes possible, and the turret 3 is caused to perform indexed swiveling by the indexed swiveling driving device 15 as a result of the engagement of the swiveling gear part 17 and transmission gear 16.

There is further provided a hydraulic sliding driving mechanism, which comprises an oil supply device used for sliding driving, a clutch release pressure chamber 6 which causes the turret 3 to slide in the axial direction by allowing oil to flow in from this oil supply device via a solenoid valve, thus releasing the anchoring and fastening of the clutch device 4, and a clutch pressure chamber 7A which constitutes a sliding movement gap 7 that is reduced by sliding in order to release the clutch of this turret 3, and which causes return sliding of the turret 3 by conversely switching the solenoid valve and causing oil to flow thereinto, thus again anchoring and fastening the clutch device 4.

To describe this further, a protruding part 21 is disposed on the swiveling shaft part 2, and the turret 3 is constructed so that gap parts which are blocked off by being sealed from each other by O-rings or the like and which are widened or narrowed by the sliding of the turret 3 are formed on both the base end and distal end of this protruding part 21. One gap part which is formed by this turret 3 and the distal end side surface of the protruding part 21 is used as the clutch release pressure chamber 6, and the other gap formed by this turret 3 and the base end side surface of the protruding part 21 is used as the clutch pressure chamber 7A constituting the sliding movement gap 7. The system is constructed as shall be described next. Namely, as a result of oil being caused to flow into the clutch release pressure chamber 6 by the oil supply device via an air supply passage 22 formed in the swiveling shaft part 2 or protruding part 21, this clutch release pressure chamber 6 is pushed open, the turret 3 is caused to slide toward the distal end part with respect to the protruding part 21 which is the fastening side, and the engagement/fastening of the clutch device 4 is released. As a result of oil conversely being caused to flow into the clutch pressure chamber 7A, the clutch pressure chamber 7A is pushed open, the turret 3 is caused to undergo return sliding toward the base end with respect to the protruding part 21 which is the fastening side, and the indexed position of the turret 3 is anchored and fastened by the clutch device 4.

In such a machine tool, not only the weight of the turret itself equipped with a plurality of tools in a manner that allows switching by swiveling, but also a large load, is applied during working, especially turning. Accordingly, a large clamping force is required. Accordingly, as was described above, in the sliding driving of the turret in a conventional automatic swiveling turret apparatus as well, it is necessary to use a hydraulic sliding mechanism, and to maintain by pushing the anchored and fastened state of the clutch by the hydraulic pressure generated by this large clamping force following the completion of the turret swiveling.

Furthermore, on the one hand, the clutch device is anchored and fastened by thus causing the return sliding of the turret using the hydraulic pressure generated by the large clamping force (return sliding driving force of the turret). Since a construction is used in which this clutch device is released by causing sliding of the turret using the hydraulic pressure generated by this large clamping force, the clutch release pressure chamber that allows oil to flow in is designed as small as possible in order to prevent a greater-than-necessary sliding driving force from being generated when the turret is caused to slide for the purpose of swiveling (i.e., in order to release the clutch). Furthermore, even if this is designed as a fairly small chamber, the sliding driving force generated by the hydraulic pressure is still fairly large; accordingly, when the sliding movement gap 7 is reduced and caused to disappear by this sliding for the purpose of clutch release so that a state of abutment is achieved, a large sliding frictional resistance is generated during clamping and swiveling by this abutting surface because of pressing caused by this hydraulic force.

Specifically, since the turret is caused to undergo return sliding by the hydraulic pressure and the anchored and fastened state caused by the clutch device is pressed and maintained, even the large load during working can be resisted; on the other hand, when the turret is swiveled after this turret is caused to slide in order to release the clutch, the sliding pressing force caused by the hydraulic pressure is large. Accordingly, a large sliding frictional resistance is generated during swiveling, resulting in severe wear and compromised durability. There is therefore a danger that biting will occur during swiveling.

Conventionally, therefore, in order to solve such problems, it has been necessary to install a hydraulic pressure reducing mechanism or the like as indicated for example in Japanese Laid-open Utility Model Application No. 57-149903 in which a bypass path is caused to communicate when the flow of oil into the clamping release pressure chamber exceeds a specified pressure, or sliding occurs in excess of a specified stroke, thus causing oil to flow into the opposite sliding movement gap (clutch pressure chamber) via this bypass path from the clamping release pressure chamber that was previously blocked off, and reducing the sliding driving.

Accordingly, problems such as a complicated structure and control, an increase in cost, a deterioration in mass production characteristics, and the like were generated, and problems have also been presented in terms of a slow unclamping speed for the release of clamping (turret swiveling), and the like.

It is an object of the present invention to conserve resources in a hydraulic-free system. Focusing on the sliding driving mechanism of the turret that engages, fastens and holds the clutch-engaged state of the turret so as to prevent swiveling, and that releases this state, as one large impediment to achieving hydraulic-free operation, the present invention overthrows the conventional concept of anchoring, and is devised so that a state in which the turret can be clutched so as to prevent swiveling can be engaged, fastened and held by an pneumatic sliding driving mechanism using an air supply device. It is an object of the present invention to provide an extremely revolutionary automatic swiveling turret apparatus for a machine tool in which the weight of the turret and a large cutting force can be sufficiently withstood by a wedge mechanism even in the case of an air type sliding driving mechanism not capable of generating a driving force that can directly withstand a large cutting force (turning force), in which, as a result, hydraulic-free operation can be realized and energy and resources can be saved without hindering turret swiveling or the cutting function, and in which a smooth swiveling function with superior durability can easily be ensured and the unclamping speed during swiveling can also be increased merely by installing a simple resistance-reducing member of a dry bearing or the like on the abutting surface (sliding surface during swiveling) of the turret during release of the engagement, without any need to install a hydraulic pressure reducing mechanism requiring complicated design and control of the type described above due to this conversion to hydraulic-free operation.

SUMMARY OF THE INVENTION

The main points of the present invention will be described with reference to the attached drawings.

A first aspect of the present invention relates to an automatic swiveling turret apparatus for a machine tool comprising: a swiveling shaft part 2 disposed on a turret stand 1; a turret 3 disposed on this swiveling shaft part 2 so that the turret 3 is free to swivel and free to slide in an axial direction; and a clutch device 4 provided for disengageably anchoring and fastening an indexed position of the turret 3 by the sliding of this turret 3 in the axial direction; sliding of the turret 3 causing the anchoring and fastening of the clutch device 4 to be released to swivel the turret 3; and causing the turret 3 again to undergo return sliding at the indexed position and to be anchored and fastened in a non-swiveling fashion by the clutch device 4, the automatic swiveling turret apparatus for a machine tool further comprising: a pneumatic sliding driving mechanism 8 having an air supply device 5 used for sliding driving, a clutch release pressure chamber 6 into which air is delivered by the air supply device 5, which causes the turret 3 to slide in the axial direction, and releases the anchoring and fastening of the clutch device 4, and a sliding movement gap 7 that is reduced by the sliding for releasing a clutch of the turret 3; a resistance reducing member 9 for reducing sliding frictional resistance during swiveling of the turret 3, provided to an inside surface part of the sliding movement gap 7 that is abutted when air is delivered into the clutch release pressure chamber 6 and the turret 3 is caused to slide; and a wedge mechanism 13 in which a wedge engaging part 10 that is moved or opened by the return sliding of the turret 3 and a wedge part 11 that engages with the wedge engaging part 10 are provided, the wedge mechanism 13 being constructed so that a wedge driving device 12 drivingly or urgingly moves the wedge part 11, which engages with the wedge engaging part 10, whereby the turret 3, which has undergone return sliding, which is anchored and fastened by the clutch device 4, and which is in a working position that does not permit swiveling, is anchored and held by the wedge.

A second aspect of the present invention relates to the automatic swiveling turret apparatus for a machine tool according to the first aspect, wherein the turret 3 is fit over the swiveling shaft part 2 fastened as a protruding part to the turret stand 1 so that the turret 3 is free to swivel, and is disposed so as to be able to perform a reciprocating sliding movement along the swiveling shaft part 2; a swiveling gear part 17 that engages with a transmission gear 16 driven by an indexed swiveling driving device 15 is disposed on the turret 3; a clutch anchoring part 18 is disposed on the turret stand 1 as the clutch device 4, and a clutch engaging part 19 that engages with the clutch anchoring part 18 is disposed on a base end part of the turret 3; the clutch anchoring part 18 and clutch engaging part 19 disengage, and swiveling becomes possible when the turret 3 is caused to slide from the base end part to the distal end part; a configuration is provided so that the turret 3 is caused to perform indexed swiveling by the indexed swiveling driving device 15 due to the engagement between the swiveling gear part 17 and the transmission gear 16; a protruding part 21 is disposed on the swiveling shaft part 2; the turret 3 is constructed so that gap parts that are separated from each other and that are widened or narrowed by the sliding of the turret 3 are formed in both the base end side and distal end side of the protruding part 21; one gap part, which is formed by the turret 3 and the distal end side surface of the protruding part 21, is used as the clutch release pressure chamber 6; the other gap part, which is formed by the turret 3 and the base end surface of the protruding part 21, is used as a clutch pressure chamber 7A, which constitutes the sliding movement gap 7 that is reduced by the sliding of the turret 3 for the purpose of releasing the clutch, or the sliding movement gap 7 in which the turret 3 is caused to slide back by the inflow of air and is anchored and fastened by the clutch device 4; a configuration is provided so that air is made to flow into the clutch release pressure chamber 6 by the air supply device 5 via the air supply path 22 disposed on the swiveling shaft part 2 or protruding part 21, whereby the turret 3 is caused to slide toward the distal end with respect to the protruding part 21 constituting the fastened side; and a dry bearing 9A is disposed as the resistance reducing member 9 on the inside surface part of the sliding movement gap 7 constituting a sliding surface when abutting results from the sliding and the turret 3 swivels.

A third aspect of the present invention relates to the automatic swiveling device for a machine tool according to either the first aspect or the second aspect, wherein the swiveling shaft part 2 is formed with a hollow structure; a sliding shaft part 23 that moves together with the sliding of the turret 3 is disposed inside the swiveling shaft part 2; the wedge engaging part 10 is disposed on the base end part of the sliding shaft part 23, or a wedge engaging part formation part 10A is disposed on the base end part of the sliding shaft part 23, and the wedge engaging part 10 is formed from the wedge engaging part formation part 10A and the turret 3 or the base end part of the swiveling shaft part 2; and the wedge mechanism 13 is constructed so that the wedge engaging part 10 can slide together with the turret 3, or is widened or narrowed by the sliding of the turret 3.

Furthermore, a fourth aspect of the present invention relates to the automatic swiveling turret apparatus for a machine tool according to either the first aspect or the second aspect, wherein the wedge driving device 12 is constructed from an air cylinder device; and pneumatic driving is used for both the sliding driving of the turret 3 that performs the engagement and disengagement of the clutch device 4, and the driving of the wedge part 11 that anchors as a wedge and holds the anchoring and fastening performed by the clutch device 4.

Furthermore, a fifth aspect of the present invention relates to the automatic swiveling turret apparatus for a machine tool according to the third aspect, wherein the wedge driving device 12 is constructed from an air cylinder device; and pneumatic driving is used for both the sliding driving of the turret 3 that performs the engagement and disengagement of the clutch device 4, and the driving of the wedge part 11 that anchors as a wedge and holds the anchoring and fastening performed by the clutch device 4.

Since the present invention is constructed as described above, an extremely revolutionary automatic swiveling turret apparatus for a machine tool in which the weight of the turret and a large cutting force can be sufficiently withstood by a wedge lock even in the case of an air type sliding driving mechanism not capable of generating a driving force that can directly withstand a large cutting force (turning force), in which, as a result, hydraulic-free operation can be realized and energy and resources can be saved without hindering turret swiveling or the cutting function, and in which a smooth swiveling function with superior durability can easily be ensured and the unclamping speed during swiveling can also be increased merely by installing the simple resistance reducing member of a dry bearing or the like on the abutting surface (sliding surface during swiveling) of the turret during release of the engagement, without any need to install a hydraulic pressure reducing mechanism requiring complicated design and control of the conventional type due to this conversion to hydraulic-free operation.

Furthermore, in the second, fourth and fifth aspects of the present invention, an even more revolutionary automatic swiveling turret apparatus for a machine tool which is superior in terms of practicality, and which allows the present invention to be easily realized using an even simpler construction, can be obtained.

Furthermore, in the third aspect of the present invention, the wedge mechanism can be constructed in a compact manner by using a simple construction, and an extremely revolutionary automatic swiveling turret apparatus for a machine tool which is even more superior in terms of practicality can be obtained.

DESCRIPTION OF THE PREFERRED EMBODIMENTS

Figure 1:
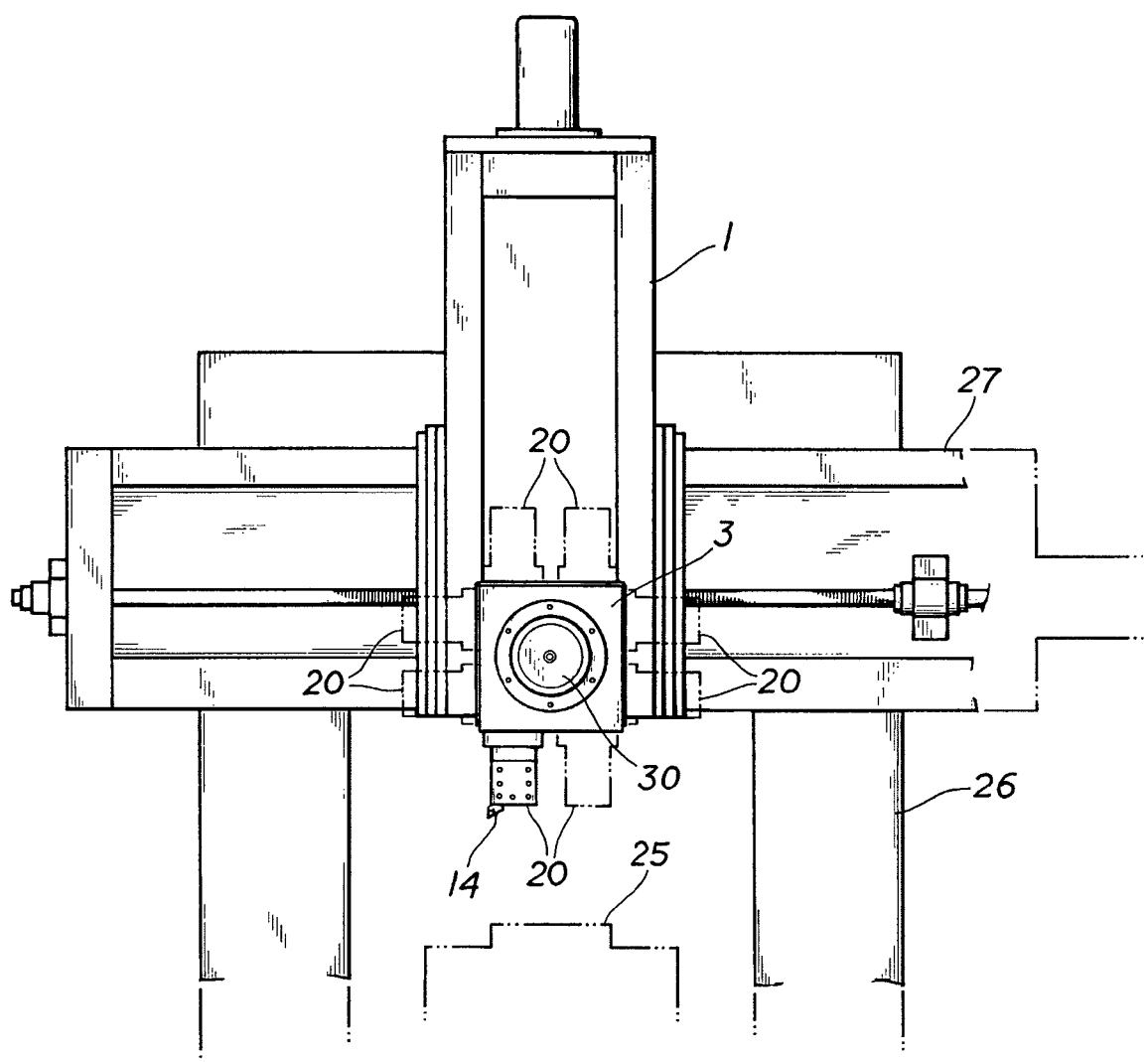
FIG. 1 is a schematic structural front view of the machine tool (vertical lathe) of the present invention.
Figure 2:
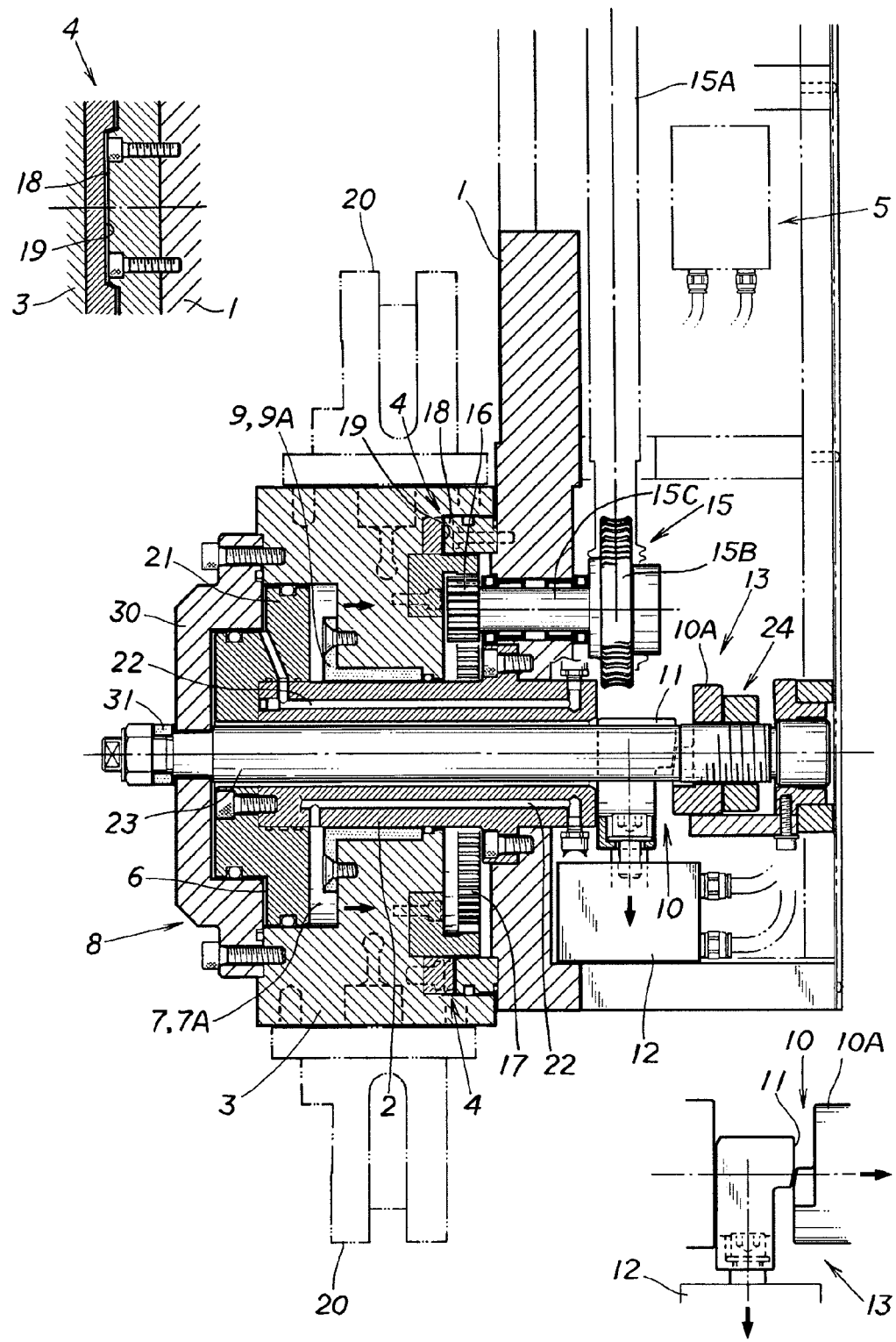
FIG. 2 is an descriptive sectional view of the anchored and fastened state (clamped state) effected by the clutch device as a result of the return sliding of the turret of the present embodiment.
Figure 3:
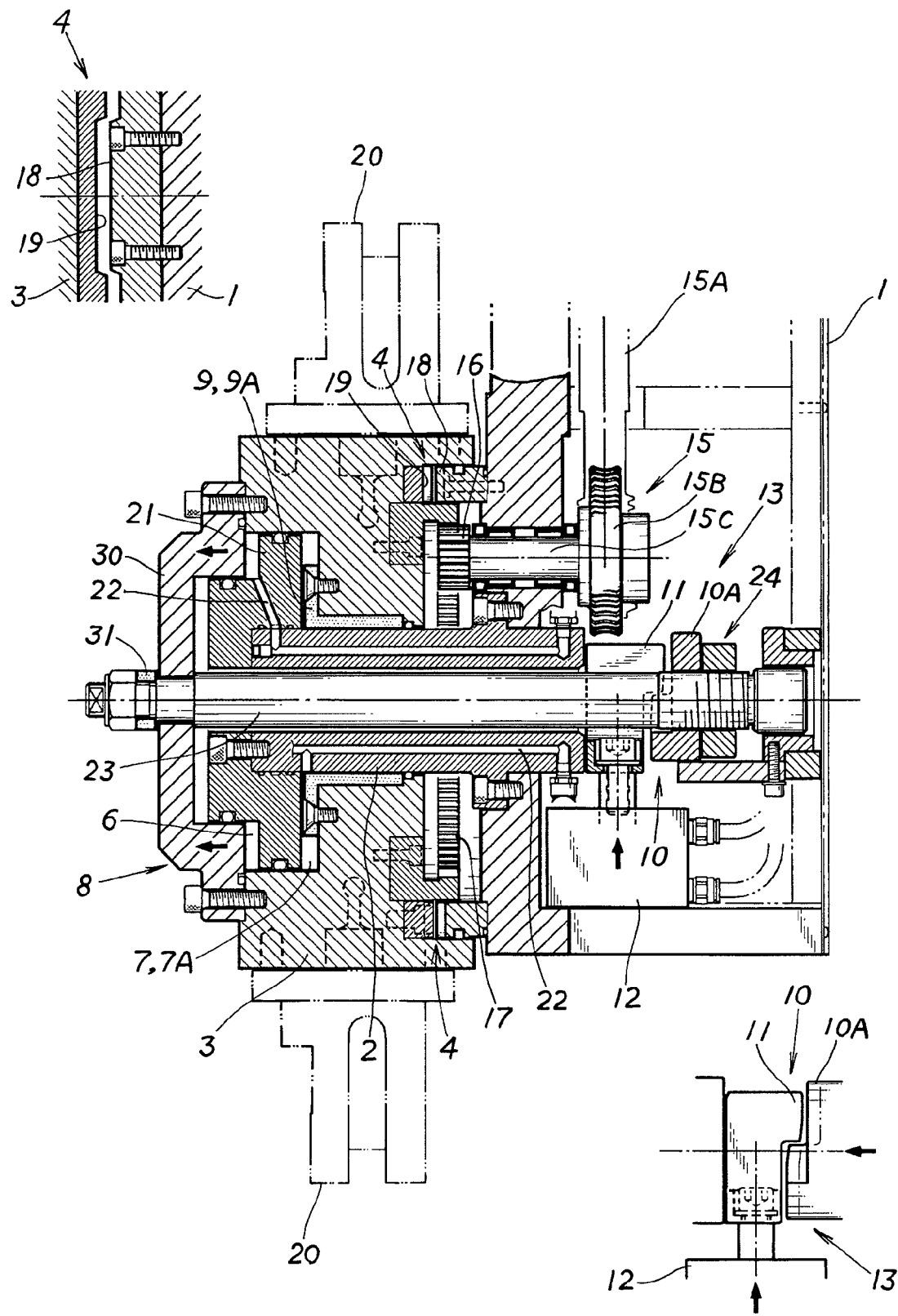
FIG. 3 is an descriptive sectional view of the swiveling-enabled state (unclamped state) in which the anchoring and fastening of the clutch device are released by the sliding of the turret of the present embodiment.
Figure 4:
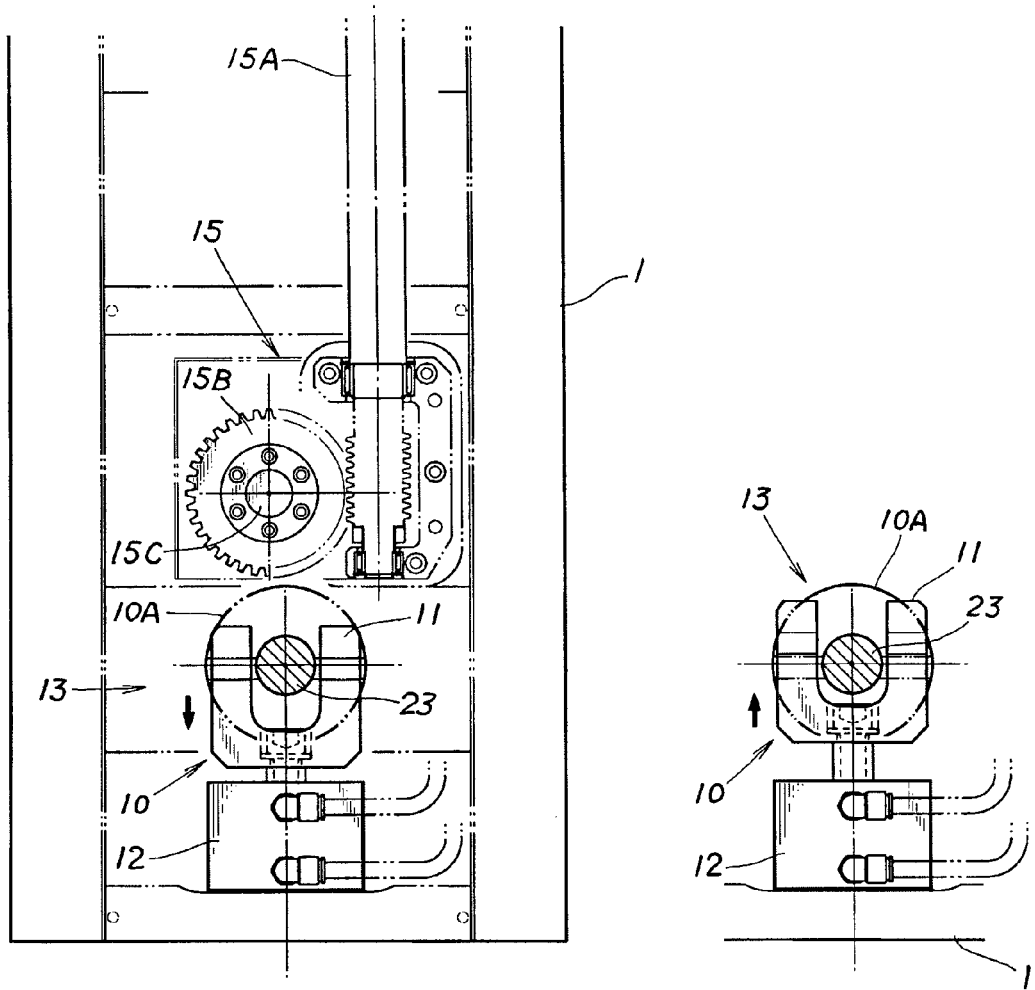
FIG. 4 shows an operating descriptive back view of essential parts and an operating descriptive side view of essential parts when the wedge of the wedge mechanism of the present embodiment is locked and when this wedge is unlocked.
Figure 4:
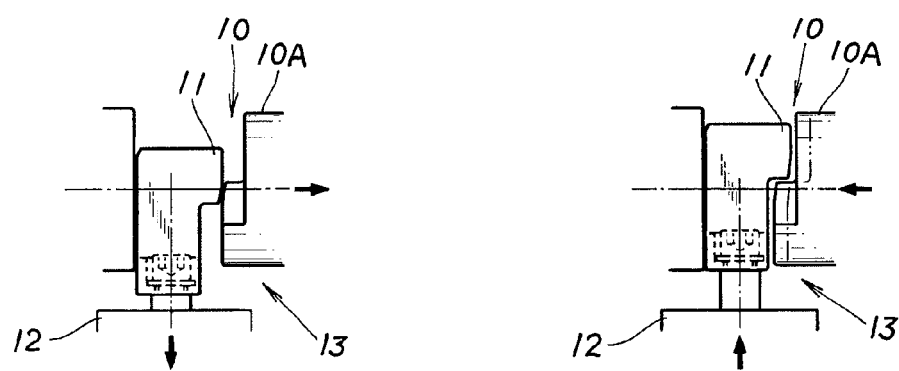

Preferred embodiments of the present invention (the working of the present invention) will be briefly described with the operation of the present invention indicated on the basis of the accompanying drawings.

In cases where a turret 3 is swiveled when tools (cutting tools 14 disposed on a holder 20) are switched, an pneumatic sliding driving mechanism 8 is first operated, the turret 3 is caused to slide in the axial direction, and the anchoring and fastening (clutch-engaged state) of a clutch device 4 are released.

Specifically, when air is caused to flow into a clutch release pressure chamber 6 by an air supply device 5 of the pneumatic sliding driving mechanism 8, the turret 3 is caused to slide in the axial direction (from the base end toward the distal end) while a sliding movement gap 7 is reduced, and a resistance reducing member 9 (e.g., dry bearing 9A) on the inside surface part of the sliding movement gap 7 strikes the opposite surface and stops.

As a result of this sliding of the turret 3, the anchoring and fastening of the clutch device 4, which was non-rotatably fastened at the indexed position by interlocking engagement, are released, thus resulting in a state in which swiveling is possible (unclamped state).

Since the sliding driving force of the turret 3 generated by this pneumatic sliding driving mechanism 8 is generated by pneumatic rather than hydraulic pressure, this force is not a large driving force. Accordingly, there is no need for the complicated design and manufacture of a small clutch release pressure chamber 6 in order to reduce the hydraulic pressure as far as possible as there is in cases where hydraulic pressure is used. Furthermore, likewise, there is no need for the complicated design and manufacture of a hydraulic pressure reducing mechanism or the like in which a high-precision bypass path such as that seen in the abovementioned conventional example is installed in order to prevent the generation of a large sliding frictional resistance by the large pressing force (sliding driving force) generated by hydraulic pressure on the abutting surface of this sliding movement gap 7 when sliding is completed, i.e., on the sliding surface during swiveling.

Unlike the case of hydraulic pressure, no large pressing force is applied to the abutting surface of this sliding movement gap 7 (this may also be the clutch pressure chamber 7A); accordingly, for example, the sliding resistance can be conspicuously reduced simply by installing a dry bearing 9A as the resistance reducing member 9, and smooth swiveling can always be obtained. Specifically, manufacture can be facilitated, and the sliding frictional resistance during swiveling can be greatly reduced; furthermore, the sliding speed of the turret 3 used for this clutch release (unclamping speed used for swiveling) can also be increased, and an extremely revolutionary automatic swiveling turret apparatus for a machine tool can be obtained.

In cases where the turret 3 is again caused to undergo return sliding after the turret 3 has been swiveled and the tool (cutting tool 14) has been changed, the inflow of air into the clutch release pressure chamber 6 may be stopped, or this may be conversely discharged, and return sliding may be effected by the return elasticity of the elastic parts. For example, as in the embodiment described later, the sliding movement gap 7 is used as the clamping pressure chamber 7A, the inflow of air into the clutch release pressure chamber 6 is stopped, the solenoid valve is conversely switched, and the turret 3 is caused to undergo return sliding by allowing the inflow of air into the clamping pressure chamber 7A.

This return sliding driving force is also obtained using pneumatic rather than hydraulic pressure; accordingly, there is a danger that it will not be possible to obtain a clamping force that is capable of directly withstanding the weight of the turret 3 itself and the cutting force. However, even if sliding driving by pneumatic is used in order to realize hydraulic-free operation, a wedge mechanism 13 is installed, return sliding is performed, and the anchored and fastened state of the clutch device 4 is again anchored in a wedged fashion and held by the engagement of a wedge part 11 with a wedge engaging part 10; accordingly, even a large load can be sufficiently withstood.

Specifically, a construction is used in which the wedge part 11 is moved by powering or driving using a wedge driving device 12 and is wedge-engaged with the wedge engaging part 10 that is moved or opened by causing the reverse sliding of the turret 3, and the anchored and fastened state of the clutch device 4 is held by a wedge (wedge-locked).

Accordingly, hydraulic-free operation is achieved in which pneumatic is used for the sliding driving of the turret 3, and pneumatic is also used for the retraction driving of this wedge part 11. For example, in the case of pneumatic, unlike the case of hydraulic pressure, even if a clamping force that can withstand a large cutting force cannot be obtained, a large cutting force can be sufficiently withstood by performing return sliding using pneumatic, and holding this by wedge-holding using a wedge mechanism 13, and hydraulic-free operation can be realized.

Furthermore, as was described above, in the unclamping (release of the anchoring and fastening of the clutch device 4) for the purpose of swiveling, driving is performed by pneumatic rather than hydraulic pressure; accordingly, there is no need for a complicated hydraulic pressure reducing mechanism as there is in the case of hydraulic pressure, and smooth swiveling can always be performed merely by installing a resistance reducing member 9 such as a dry bearing 9A or the like on the abutting surface of the inside surface part of the sliding movement gap 7 (sliding surface of the turret 3 during swiveling). Accordingly, a conversion to hydraulic-free operation can be achieved, and a revolutionary automatic swiveling turret apparatus for a machine tool can be obtained in which swiveling can always be smoothly performed by a construction which has a simple structure and which is superior in terms of mass productivity, and in which unclamping can also be speedily performed.

EMBODIMENTS

Concrete embodiments of the present invention will be described with reference to the attached drawings.

In the present embodiment, as is shown in FIG. 1, the present invention is applied to an automatic turret swiveling device for a machine tool such as a vertical lathe or the like in which respective tools (cutting tools 14 that can be freely replaced on a holder 20) are disposed on the four surfaces of a turret 3 having a square shape that allows movement and control in the X, Y and Z directions via a column 26, a cross rail 27, and a turret stand 1 with respect to a workpiece 25, and since this turret 3 has the square shape used in the present embodiment, the turret 3 can be positioned at 90-degree intervals with respect to the turret stand 1, and the tools used (cutting tools 14) can be switched (furthermore, for example, in the case of a hexagonal turret, indexing and switching are performed at 60-degree intervals).

In the present embodiment, a turret 3 wherein holders 20, in which these cutting tools 14 are exchangeably disposed, and which are installed on the respective surfaces, is swivelably fit over a swiveling shaft part 2 fastened as a protruding part to the turret stand 1, and is installed in a manner that allows reciprocating sliding along this swiveling shaft part 2.

There is provided a clutch device 4 that is anchored and fastened so that an indexed position of the turret can be freely engaged and disengaged by the sliding of this turret 3 in the axial direction, the anchoring and fastening of the clutch device 4 are released (unclamped) and the turret 3 is made free to swivel by the sliding of the turret 3 from the base end part to the distal end part. The system is constructed so that anchoring and fastening so as to prevent swiveling are accomplished by the clutch device 4 by again causing return sliding of the turret 3 at the indexed position following swiveling.

This clutch device 4 of the present embodiment has a construction in which a coupling part is disposed between the turret stand 1 and turret 3. Specifically, clutch anchoring parts 18 are disposed in four places on the circumference of the swiveling shaft part 2 of the turret stand 1, clutch engaging parts 19 which engage in an interlocking manner so as to prevent turning with these clutch anchoring parts 18 are disposed on the circumference of the base end part of the turret 3, and when the turret 3 is caused to slide from the base end part to the distal end part, the engagement between the clutch anchoring parts 18 and clutch engaging parts 19 is released, and swiveling becomes possible. When return sliding is performed, engagement that prevents rotation (anchoring and fastening) is again performed at indexed positions every 90 degrees, and swiveling becomes impossible.

Furthermore, in the present embodiment, a swiveling gear part 17 that engages with the transmission gear 16 driven by the indexed swiveling driving device 15 is disposed on this turret 3, and the system is constructed so that when the turret 3 is caused to slide and placed in an unclamped state, the turret 3 is caused to perform indexed swiveling by the swiveling driving device 15 as a result of the engagement of the swiveling gear part 17 and transmission gear 16.

In concrete terms, a turret drive shaft 15A that is caused to rotate by an indexed-driving source (not shown) is installed inside the turret stand 1. A driven shaft 15C is disposed on this turret drive shaft 15A facing the turret 3 base end part of the front surface 1 of the turret stand 1 via a worm gear 15B, the transmission gear 16 is disposed on the distal end part of this driven shaft 15C, an internal gear 17 which engages with this transmission gear 16 is disposed on the base end part of the turret 3 as the swiveling gear part 17, and the system is constructed so that the rotational driving of the transmission gear 16 by the turret drive shaft 15A of this indexed swiveling driving device 15 causes swiveling via the swiveling gear part 17 (internal gear 17) that engages therewith. In this swiveling driving, the thickness of the transmission gear 16 is set at a value that is greater than the thickness of the internal gear 17, so that an engaged state is maintained even if the turret 3 should slide.

Furthermore, the pneumatic sliding driving mechanism of the present embodiment is constructed from an air supply device 5 used for sliding driving, a clutch release pneumatic chamber 6 which releases the anchoring and fastening of the clutch device 4 by causing the turret 3 to slide in the axial direction through the inflow of air using this air supply device 5, and a clutch pressure chamber 7A which is a sliding movement gap 7 that is narrowed by this sliding of the turret 3 for the purpose of clutch release, and which conversely effects switching using the solenoid valve and allows air to flow into this from the air supply device 5 so that the turret 3 is caused to perform return sliding, and anchoring and fastening are again performed by the clutch device 4.

In the present embodiment, to describe this further, a protruding part 21 which protrudes in umbrella form around the circumference is disposed on the distal end part of the swiveling shaft part 2, and the turret 3 is constructed so that gap parts which are blocked off from each other by sealing using O-rings or the like, and which are widened and narrowed by the sliding of the turret 3, are formed on both the base end side (turret stand side) and distal end side (front surface side) of the protruding part 21 that constitutes a fastened part together with this swiveling shaft part 2. Specifically, a portion of the inside surface of the turret 3 contacts the outer circumferential surface of the protruding part 21 via O-rings in an airtight state that allows sliding, and the turret 3 is constructed with a shape that covers both the distal end side and base end side of this protruding part 21 via these gap parts. One gap part which is formed by this turret 3 and the step surface on the distal end side of the protruding part 21 is used as the clutch release pressure chamber 6, and the other gap part formed by this turret 3 and the base end side surface of the protruding part 21 is used as the clutch pressure chamber 7A which constitutes the sliding movement gap 7. The system is constructed so that air is caused to flow into clutch release pressure chamber 6 by the air supply device 5 via the air supply passage 22 formed in the swiveling shaft part 2 and the protruding part 21, thus pushing and opening the clutch release pressure chamber 6, and causing the turret 3 to slide toward the distal end side with respect to the protruding part 21 constituting the fastened side, so that the anchoring and fastening of the clutch device 4 are released, and is constructed so that the clutch pressure chamber 7A is conversely pushed and opened by causing air to flow into the clutch pressure chamber 7A, thus causing the turret 3 to perform return sliding toward the base end side with respect to the protruding part 21 constituting the fastened side, so that the indexed position of the turret 3 is anchored and fastened by the clutch device 4.

Furthermore, in the present embodiment, a wedge mechanism 13 is provided in which a wedge engaging part 10 that is moved or opened by the return sliding of the turret 3, and a wedge part 11 that engages with this wedge engaging part 10, are installed, this wedge part 11 is moved by powering or by driving using a wedge driving device 12 so as to engage with the wedge engaging part 10, thus wedge-anchoring and holding (wedge-locking) the turret 3 in a working position that does not allow swiveling, which is anchored and fastened by the clutch device 4 as a result of return sliding.

In concrete terms, in the present embodiment, the swiveling shaft part 2 is formed with a hollow structure, and a sliding shaft part 23 which moves together with the sliding of the turret 3 is disposed inside this swiveling shaft part 2. Specifically, the sliding shaft part 23 is passed through the protruding part 21 and swiveling shaft part 2 via a sliding shaft bearing 31 (dry bearing 31 used for the sliding shaft part 23) in a cap 30 of the turret 3 which covers the distal end side of the protruding part 21, and the wedge engaging part 10 is disposed on the base end part of the sliding shaft part 23 that passes through from the swiveling shaft part 2.

Furthermore, in the present embodiment, this wedge engaging part 10 is constructed from the base end surface of the swiveling shaft part 2 and a wedge engaging part formation part 10A disposed on the sliding shaft part 23. Specifically, a wedge engaging part formation part 10A is disposed on the base end part of the sliding shaft part 23, and the wedge engaging part 10 is formed by this wedge engaging part formation part 10A and the base end part of the abovementioned swiveling shaft part 2; the wedge mechanism 13 is constructed so that the wedge engaging part 10 is widened and narrowed by the anchoring and fastening of the turret 3 by the clutch device 4, and the axial-direction sliding that is performed in order to release this anchoring and fastening (by the sliding of the sliding shaft part 23 and sliding of the wedge engaging part formation part 10A).

To repeat this description, sliding for the purpose of releasing the clamping of the turret 3 can be accomplished by releasing the wedge anchoring of the wedge engaging part 10 and wedge part 11. As a result of the sliding of the sliding shaft part 23 through this sliding of the turret 3, the wedge engaging part formation part 10A moves with respect to the base end part of the swiveling shaft part 2 which is the fastened side, and the wedge engaging part 10 is narrowed (in this embodiment, the engaging opening width of the wedge engaging part 10 narrows while the wedge pat 11 remains engaged with the wedge engaging part 10). Conversely, as a result of the return sliding of the turret 3, the wedge engaging part 10 is widened, and the wedge part 11 is pushed in (in the present embodiment, the wide part of the wedge part 11 is moved toward the narrow part of the wedge engaging part 10 from the wide part by being pulled, and is caused to bite into this narrow part), so that wedge locking can be accomplished.

Furthermore, this wedge engaging part formation part 10A has a construction which is screwed into a screw part on the base end part of the sliding shaft part 23, and is constructed so that the position can be freely adjusted, and so that the position can be fixed using a fastening nut 24. Specifically, the system is constructed so that the position of the wedge engaging part 10 can be freely adjusted. In the present embodiment, the system is constructed so that the wedge engaging part formation part 10A can be freely moved and adjusted with respect to the fastened side, and so that the engaging opening width of the wedge engaging part 10 can be finely adjusted.

Furthermore, the wedge mechanism 13 of the present embodiment is constructed so that the wedge part 11 can be driven in the direction of retraction by the wedge driving device 12, and wedge-engaged with this wedge engaging part 10. Specifically, the present embodiment is constructed so that a wedge driving device 12 (using an air cylinder device) is used which performs retraction driving without using any elastic force, the wedge part 11 is driven by pneumatic along with the retraction, and the wedge part 11 is engaged by pulling with the wedge engaging part 10 in an opened state by the return sliding of the turret 3 as described above. In concrete terms, as was described above, both the wedge engaging part 10 and the wedge part 11 are formed with a shape that has a wide part and a narrow part, and the turret 3 is caused to undergo return sliding during clamping from an unclamped state narrowed from the engage state with extra room (in a state in which the wedge anchoring is released), so that the engaging opening width of the wedge engaging part 10 is widened, and the wide part of the wedge part 11 is engaged (wedge-anchored) by biting in caused by a pulling movement with the narrow part of the wedge engaging part 10. The biting-in contact parts of the narrow part of the wedge engaging part 10 and wide part of the wedge part 11 that thus effect wedge locking are formed as tapered parts so that this wedge engagement is smoothed, and a strong engagement is achieved.

Furthermore, in the present embodiment, a resistance reducing member 9 which reduces the sliding frictional resistance during the swiveling of the turret 3 is disposed on the inside surface part of the sliding movement gap 7 (clutch pressure chamber 7A) that is narrowed and caused to abut by the sliding of the turret 3 for the purpose of clutch release when the turret 3 is caused to slide by the inflow of air into the clutch release pressure chamber 6. Specifically, a dry bearing 9A (e.g., a plate-form dry bearing) is installed as the resistance reducing member 9 on the inside surface part of the sliding movement gap 7 which causes the turret 3 to slide toward the distal end with respect to the protruding part 21 constituting the fastened end by the inflow of air into the clutch release pressure chamber 6 by the air supply device 5 via the air supply passage 22, and which acts as the sliding surface during the swiveling of the abutting turret 3 when the gap is conversely narrowed.

In concrete terms, this dry bearing 9A comprises a tubular bearing interposed part which is interposed between the turret 3 and the swiveling shaft part 2, and which causes the turret 3 to swivel and slide smoothly with respect to the swiveling shaft part 2, and a sliding driving force receiving part which abuts against the base end part of the protruding part 21 disposed inside the clutch pressure chamber 7A and which can cause the turret 3 to swivel smoothly even when the sliding driving force of the turret 3 is received. Specifically, a plate-form dry bearing 9A may be simply installed on the abutting surface inside the sliding movement gap 7; in the present embodiment, however, plate-form dry bearings 9A are connected on the periphery of the tubular bearing interposed part, and this assembly is split between the turret 3 and the swiveling shaft part 2; furthermore, the dry bearing 9A constituting the flange part is installed on the turret side forming surface of the sliding movement gap 7 (clutch pressure chamber 7A), thus constructing a dry bearing 9A which reduces the sliding resistance for both the contact parts of the protruding part 21 and swiveling shaft part 2 with respect to the swiveling and sliding of the turret 3.

Accordingly, in the present embodiment, pneumatic driving incorporating an air supply device 5 is used for the sliding driving mechanism 8 of the turret 3, and the wedge driving device 12 of the wedge mechanism 13 is also constructed from an air cylinder device; accordingly, pneumatic driving is used for both the sliding driving of the turret 3 that performs engagement and disengagement of the clutch device 4, and the retraction driving of the wedge part 11 that anchors as a wedge and holds the anchoring and fastening by the clutch device 4, so that hydraulic-free operation is achieved.

However, in the case of pneumatic, unlike hydraulic pressure, even if a clamping force that can withstand a large cutting force cannot be obtained, return sliding is performed by the pneumatic, a large cutting force can be sufficiently withstood by wedge-anchoring and holding this using a wedge mechanism 13, and hydraulic-free operation can be realized.

Since hydraulic pressure is not used, as described above, driving is performed by pneumatic rather than hydraulic pressure in the case of unclamping for the purpose of swiveling (release of the anchoring and fastening of thee clutch device 4); accordingly, there is no need for a complicated hydraulic pressure reducing mechanism as there is in the case of hydraulic pressure, and smooth swiveling can be consistently accomplished merely by installing a resistance reducing member 9 such as a dry bearing 9A or the like on the abutting surface of the inside surface part of the sliding movement gap 7 (sliding surface during swiveling of the turret 3).

Accordingly, hydraulic-free operation can be achieved, and a revolutionary automatic swiveling turret apparatus for a machine tool can be obtained so that smooth swiveling can be consistently accomplished using a construction which has a simple structure and which is superior in terms of mass productivity, and in which unclamping can also be speedily performed.

Using the construction described above, a compact design can be obtained using a much simpler construction. Furthermore, the design and manufacture of the wedge mechanism 13 are also especially facilitated, and an extremely superior automatic swiveling turret apparatus for a machine tool in which adjustment for reliable wedge locking is also extremely easy can be obtained. Moreover, the installation of the dry bearing 9A is also extremely easy, and an even more revolutionary automatic swiveling turret apparatus for a machine tool in which a turret apparatus capable of smooth sliding and swiveling can easily be realized can be obtained.

The present invention is not limited to the present embodiments; a concrete construction with various conditions can be appropriately designed.

What is claimed is:

1. An automatic swiveling turret apparatus for a machine tool comprising:

a swiveling shaft part disposed on a turret stand;

a turret disposed on this swiveling shaft part so that the turret is free to swivel and free to slide in an axial direction; and a clutch device provided for disengageably anchoring and fastening an indexed position of the turret by the sliding of this turret in the axial direction;

sliding of the turret causing the anchoring and fastening of the clutch device to be released to swivel the turret; and causing the turret again to undergo return sliding at the indexed position and to be anchored and fastened in a non-swiveling fashion by the clutch device; the automatic swiveling turret apparatus for a machine tool further comprising:

a pneumatic sliding driving mechanism having an air supply device used for sliding driving, a clutch release pressure chamber into which air is delivered by the air supply device, which causes the turret to slide in the axial direction, and releases the anchoring and fastening of the clutch device, and a sliding movement gap that is reduced by the sliding for releasing a clutch of the turret;

a resistance reducing member for reducing sliding frictional resistance during swiveling of the turret, provided to an inside surface part of the sliding movement gap that is abutted when air is delivered into the clutch release pressure chamber and the turret is caused to slide; and a wedge mechanism in which a wedge engaging part that is moved or opened by the return sliding of the turret and a wedge part that engages with the wedge engaging part are provided, the wedge mechanism being constructed so that a wedge driving device drivingly or urgingly moves the wedge part, which engages with the wedge engaging part, whereby the turret, which has undergone return sliding, which is anchored and fastened by the clutch device, and which is in a working position that does not permit swiveling, is anchored and held by the wedge.

2. The automatic swiveling turret apparatus for a machine tool according to claim 1, wherein the turret is fit over the swiveling shaft part fastened as a protruding part to the turret stand so that the turret is free to swivel, and is disposed so as to be able to perform a reciprocating sliding movement along the swiveling shaft part;

a swiveling gear part that engages with a transmission gear driven by an indexed swiveling driving device is disposed on the turret;

a clutch anchoring part is disposed on the turret stand as the clutch device, and a clutch engaging part that engages with the clutch anchoring part is disposed on a base end part of the turret;

the clutch anchoring part and clutch engaging part disengage, and swiveling becomes possible when the turret is caused to slide from the base end part to the distal end part;

a configuration is provided so that the turret is caused to perform indexed swiveling by the indexed swiveling driving device due to the engagement between the swiveling gear part and the transmission gear;

a protruding part is disposed on the swiveling shaft part;

the turret is constructed so that gap parts that are separated from each other and that are widened or narrowed by the sliding of the turret are formed in both the base end side and distal end side of the protruding part;

one gap part, which is formed by the turret and the distal end side surface of the protruding part, is used as the clutch release pressure chamber;

the other gap part, which is formed by the turret and the base end surface of the protruding part, is used as the clutch pressure chamber, which constitutes the sliding movement gap that is reduced by the sliding of the turret for the purpose of releasing the clutch, or the sliding movement gap in which the turret is caused to slide back by the inflow of air and is anchored and fastened by the clutch device;

a configuration is provided so that air is made to flow into the clutch release pressure chamber by the air supply device via the air supply path disposed on the swiveling shaft part or protruding part, whereby the turret is caused to slide toward the distal end with respect to the protruding part constituting the fastened side; and a dry bearing is disposed as the resistance reducing member on the inside surface part of the sliding movement gap constituting a sliding surface when abutting results from the sliding and the turret swivels.

3. The automatic swiveling device for a machine tool according to either one of claims 1 or 2, wherein the swiveling shaft part is formed with a hollow structure;

a sliding shaft part that moves together with the sliding of the turret is disposed inside the swiveling shaft part;

the wedge engaging part is disposed on the base end part of the sliding shaft part, or a wedge engaging part formation part is disposed on the base end part of the sliding shaft part, and the wedge engaging part is formed from the wedge engaging part formation part and the turret or the base end part of the swiveling shaft part; and the wedge mechanism is constructed so that the wedge engaging part can slide together with the turret, or is widened or narrowed by the sliding of the turret.

4. The automatic swiveling turret apparatus for a machine tool according to either one of claims 1 or 2, wherein the wedge driving device is constructed from an air cylinder device; and pneumatic driving is used for both the sliding driving of the turret that performs the engagement and disengagement of the clutch device, and the driving of the wedge part that anchors as a wedge and holds the anchoring and fastening performed by the clutch device.

5. The automatic swiveling turret apparatus for a machine tool according to claim 3, wherein the wedge driving device is constructed from an air cylinder device; and pneumatic driving is used for both the sliding driving of the turret that performs the engagement and disengagement of the clutch device, and the driving of the wedge part that anchors as a wedge and holds the anchoring and fastening performed by the clutch device.

* * * * *